(12) United States Patent
Evans (10) Patent No.: US 9,716,862 B1
(45) Date of Patent: Jul. 25, 2017

(54) SYSTEM AND METHODS FOR CAPTURING SITUATIONAL AWARENESS

(71) Applicant: The Boeing Company, Seal Beach, CA (US)

(72) Inventor: Joseph Wilbur Evans, Houston, TX (US)

(73) Assignee: THE BOEING COMPANY, Chicago, IL (US)

( * ) Notice: Subject to any disclaimer, the term of this patent is extended or adjusted under 35 U.S.C. 154(b) by 575 days.

(21) Appl. No.: 13/668,397

(22) Filed: Nov. 5, 2012

(51) Int. Cl.
*H04N 7/18* (2006.01)

(52) U.S. Cl.
CPC ................................ *H04N 7/183* (2013.01)

(58) Field of Classification Search
None
See application file for complete search history.

(56) References Cited

U.S. PATENT DOCUMENTS

| | | | |
|---|---|---|---|
| 4,505,441 A * | 3/1985 | Kirsch | F41G 7/22 102/362 |
| 5,154,370 A | 10/1992 | Cox et al. | |
| 5,350,138 A * | 9/1994 | Culbertson | B64G 1/646 244/159.6 |
| 5,566,908 A | 10/1996 | Greenhalgh | |
| 5,768,885 A * | 6/1998 | Johnson | F02K 9/50 60/204 |
| 6,322,021 B1 | 11/2001 | Fisher et al. | |
| 6,530,543 B2 * | 3/2003 | Redding, Jr. | B64G 1/12 244/159.1 |
| 6,601,795 B1 | 8/2003 | Chen | |
| 6,868,314 B1 * | 3/2005 | Frink | B64C 1/00 244/119 |
| 6,926,576 B1 | 8/2005 | Alway et al. | |
| 7,586,514 B1 * | 9/2009 | Salazar | F41G 3/02 348/144 |
| 2005/0218260 A1 * | 10/2005 | Corder | B64C 3/56 244/49 |
| 2012/0181376 A1 * | 7/2012 | Flood, Jr. | F42B 15/01 244/3.27 |

* cited by examiner

*Primary Examiner* — Kate Luo
(74) *Attorney, Agent, or Firm* — Armstrong Teasdale LLP (57) ABSTRACT

Systems and methods for capturing situational awareness information are provided. The systems and methods include a portable aircraft configured to obtain situational awareness information. The portable aircraft includes a body including deployable wings, a stability device coupled to the body, the stability device including deployable tail fins, a propulsion device configured to propel the portable aircraft aloft, a capture device configured to selectively capture situational information, and a communications device configured to transmit captured situational information to a ground based receiver.

20 Claims, 9 Drawing Sheets

SYSTEM AND METHODS FOR CAPTURING SITUATIONAL AWARENESS

BACKGROUND

The field of the disclosure relates generally to situational awareness information, and more specifically, to a portable aircraft that may be used to capture situational awareness information.

Situational awareness information is helpful and/or necessary when entering a hostile or remote environment that may contain hazardous terrain, objects, and/or people. For example, military, law enforcement, firefighters, disaster-recovery teams, and/or search and rescue teams openly rely on time-critical situational awareness information prior to and sometimes during deployment in an area that may threaten their lives. Situational awareness information can provide information that enables a person to mitigate or eliminate their risk before advancing into or from a hostile or remote environment.

Some known situational awareness systems utilize Unmanned Aerial Vehicles (UAVs) to gather information but the costs of such systems may limit their use in a number of situations because of the large team of operators necessary to support the system, as well as the need to employ a wide range of systems, networks, and logistical support. Moreover, such systems may also be expensive to manufacture and/or may require a substantial effort to transport. Accordingly, there is a need for a portable, cost-effective system that is capable of capturing situational awareness information.

BRIEF DESCRIPTION

In one aspect, a portable aircraft for use in obtaining situational awareness information is provided. The aircraft includes a body including deployable wings, a stability device coupled to the body, the stability device including deployable tail fins, a propulsion device configured to propel the portable aircraft aloft, a capture device configured to selectively capture situational information, and a communications device configured to transmit captured situational information to a ground based receiver.

In another aspect, a portable system configured to obtain situational awareness information aloft is provided. The portable system includes a launch apparatus and an aircraft configured to launch from the launch apparatus and to obtain situational awareness information. The aircraft includes a body including deployable wings, a stability device coupled to the body, the stability device including deployable tail fins, a propulsion device configured to propel the portable aircraft aloft, a capture device configured to selectively capture situational information, and a communications device configured to transmit captured situational information to a ground based receiver.

In yet another aspect, a method for obtaining situational awareness information is provided. The method includes launching a portable aircraft aloft, guiding said portable by at least one of a flight control system and a user located outside the portable aircraft, capturing situational awareness information of a target of interest, and transmitting the captured situational awareness information to a portable device located outside the portable aircraft.

The features, functions, and advantages that have been discussed can be achieved independently in various implementations or may be combined in yet other implementations, further details of which can be seen with reference to the following description and drawings.

DETAILED DESCRIPTION

The systems and methods described herein facilitate capturing potentially life-saving situational awareness information cost-effectively. In one implementation, a computing device onboard an aircraft communicates with a portable device that receives situational awareness information, such as the real-time imaging of a target of interest transmitted from the aircraft. The situational awareness information received may be displayed on the portable device along with coordinates that identify the location of the information.

Figure 1:
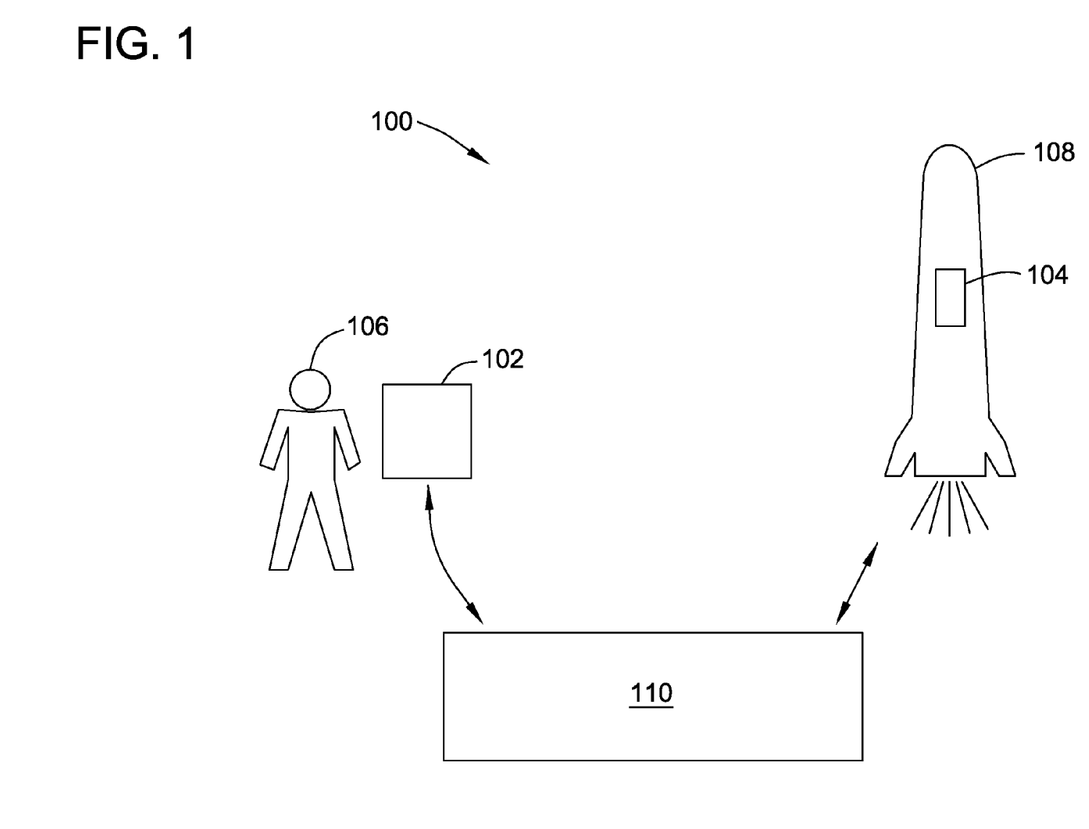
FIG. 1 is a schematic diagram of an exemplary situational awareness system.

FIG. 1 is a schematic diagram of an exemplary situational awareness system 100. In the present implementation, system 100 includes a portable device 102 that receives situational awareness information from a computing device 104, as described in more detail below. Initially, a user 106 interacts with and/or operates portable device 102 to obtain situational awareness information. Portable device 104 may include, without limitation, smartphones, tablet personal computers, mobile network devices, and/or mobile handheld devices (e.g., an iPad® device). As used herein, the term "situational awareness information" may include aircraft position information, imaging information, and/or any other data that may be transmitted and/or received within system 100. As used herein, the term "portable" is used generally to refer to the transportability of an apparatus and/or device. Portable includes the ability for an apparatus and/or device to be manually carried and be easily manipulated by a person acting alone. More specifically, a portable device and/or apparatus has a weight that enables the device and/or apparatus to be manually carried and the device and/or apparatus has a size that enables the device and/or apparatus to be easily manipulated by a person acting alone.

In the exemplary implementation, computing device 104 is located onboard an aircraft 108. As used herein, the term "aircraft" may include, that is not limited to only including, airplanes, unmanned aerial vehicles (UAVs), missiles, rockets, gliders, helicopters, balloons, and/or any other object that travels thorough airspace.

To transmit situational awareness information, computing device 104 communicates with other devices and/or systems over a communications link 110. In the present implementation, computing device 104 utilizes communications link 110 to communicate with portable device 102. Communications link 110 may include, but is not limited to, a wired and/or wireless network, an Iridium satellite network, radio, 3G, 4G, Controller Pilot Data Link (CPDL), and Tactical Digital Information Links (TADIL). In some implementations, portable device 102 may communicate different types of data using different communication links 110. For example, a 3G link may have a lower link latency, lower dropout rate, etc.

Figure 2:
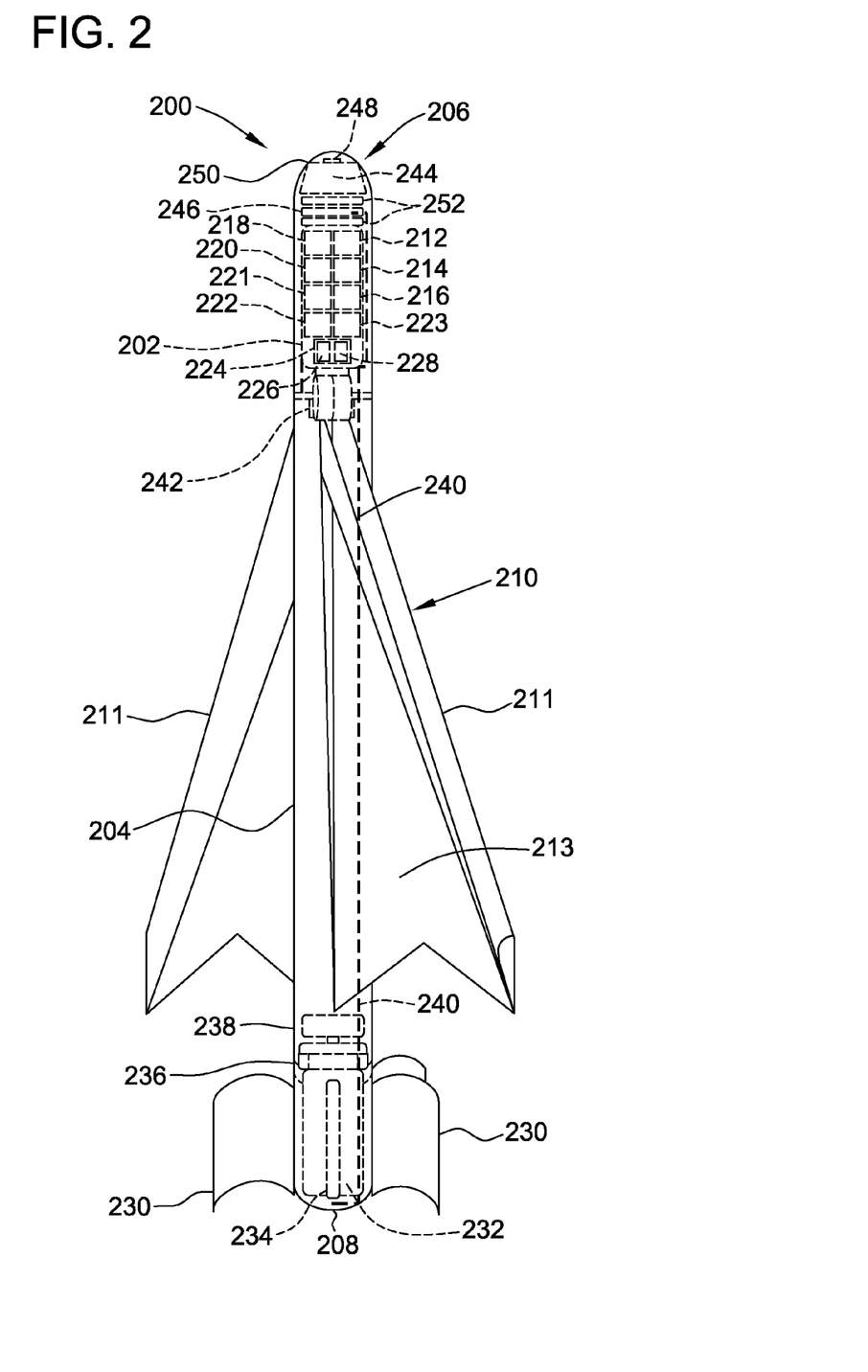
FIG. 2 is a sectional view of an exemplary aircraft and computing device that may be used as part of the system shown in FIG. 1.

FIG. 2 is a sectional view of an exemplary aircraft 200 and computing device 202 that may be used as part of system 100 shown in FIG. 1, such as aircraft 108 and computing device 104. In the present implementation, aircraft 200 is a UAV rocket. Alternatively, aircraft 200 may be any aircraft that enables system 100 to function as described herein. In the present implementation, aircraft 200 includes a body 204 with a nose cone 206, a pivotable tail section or stability device 208 with deployable tail fins 230, and deployable wings 210. Moreover, in the present implementation, deployable wings 210 each include a leading edge 211 that is formed by a portion of body 204 and a wing skin 213. Wing skin 213 extends over leading edge 210 and can be fabricated from any light-weight and flexible material that can be made water resistant, such as, but not limited to, a ripstop type plastic, a fabric nylon, and a fabric cloth. In the present implementation, at least one computing device 202 is secured within body 204. In an alternative implementation, at least one computing device 202 is coupled to an exterior of body 204. Moreover, in the present implementation, computing device 202 includes a flight computer or flight control system 212, an attitude measuring device 214, a 3-dimensional accelerometer 216, a communications device 218, a GPS sensor 220, an altitude measuring device 221, an airspeed measuring device 222, a ground speed measuring device 223 and Intelligence, Surveillance and Reconnaissance (ISR) equipment 224. In some implementations, one or more of devices 212, 214, 216, 218, 220, 221, 222, 223, and 224 provide navigational redundancy that meets approval for an approving authority (e.g., FAA). In one implementation, where no approving authority exists, no redundant navigational devices are needed and computing device 202 may include only select devices.

In one implementation, ISR equipment 224 includes at least one camera 226 that captures still, video, and/or infrared images. In some implementations, ISR equipment 224 is known as a capture device. ISR equipment 224 also includes a tracking device 228 to keep any identified targets of interest in the field of view of camera 226 by positioning camera 226 relative to aircraft body 204. The tracking device can utilize any tracking technology including, but not limited to, visual, acoustic, radio, laser, and radar. In one implementation, ISR equipment 224 includes a microphone or any other listening device that enables digital signatures of a target of interest to be obtained. In one implementation, tracking device 228 keeps the microphone or other listening device pointed towards an acquired digital signature of a selected target of interest. Tracking device 228 can be constructed of a gimbaled platform that enables a device (e.g., camera or microphone) to remain oriented towards a selected target of interest.

In the present implementation, GPS sensor 220 determines geopositional information for aircraft 200, and accordingly, geopositional information for computing device 202 onboard aircraft 200. Geopositional information may include, for example, the current latitude, longitude, and/or altitude of aircraft 200. The geopositional information may be calculated, for example, by communicating with satellites using communications device 218. The situational information transmitted from computing device 202 may be decomposed into geopositional information of selected targets of interest and displayed on portable device 102.

Figure 4:
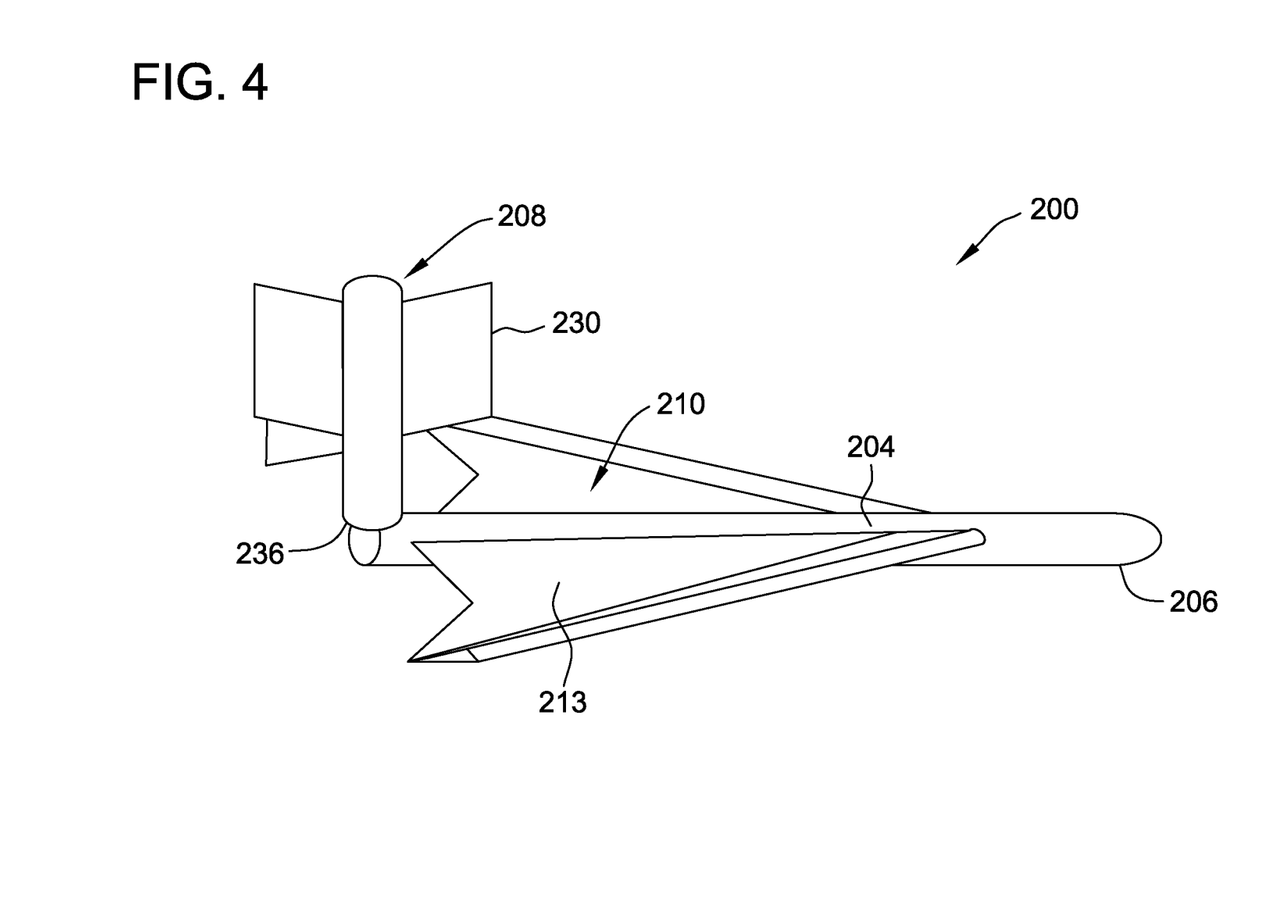
FIG. 4 is a schematic view of an exemplary aircraft that may be used as part of the system shown in FIG. 1, the aircraft having a tail portion positioned substantially perpendicular to the aircraft body.

In the present implementation, pivotable tail section 208 includes a plurality of deployable tail fins 230, a rocket motor 232, and an igniter 234 within rocket motor 232. In one implementation, rocket motor 232 is a propellant powered rocket motor, however, rocket motor 232 can be any rocket motor that propels aircraft 200 aloft as described herein. In one implementation, rocket motor 232 includes a rocket exhaust nozzle, combustion chamber, propellant, and propellant canister. Internal wiring 240 connects the igniter to an electronic ignition control switch connected to a battery. The switch is wirelessly controlled remotely via radio or infrared transmission or by a manually activated ignition delay switch. Since rockets are inherently dangerous, a manual or remote arm switch that is physically separate from the ignition switch can be installed into the system to reduce the risk of inadvertent rocket motor ignition. In the present implementation, igniter 234 is a known remote igniter that enables a user to ignite rocket motor 232 remotely. In one implementation, igniter 234 is a manual igniter requiring a user to manually ignite a portion of igniter 234. Alternatively, igniter 234 is coupled to computing device 202 and ignites in response to a signal received from computing device 202 and/or portable device 102. In one implementation, rocket motor 232 is a reusable canister filled with known rocket fuel and/or unburned propellant. Pivotable tail section 208 is coupled to body 204 at a tail section pivot point 236, which allows tail section to rotate into a position substantially perpendicular to body 204 (e.g., gimbal) in a aircraft body pitch plane's positive and negative direction. A 2-axis motor 238 is coupled to pivotable tail section 208 and computing device 202 to enable the rotation of tail section 208 relative to body 204. Such movement enables aircraft 200 to stabilize flight during a free-fall from a maximum altitude position such as that shown in FIG. 4 or during any other unusual flight attitude situation.

In one implementation, a wing deploy trigger 240 is coupled to rocket motor 232 and igniter 234. In such an implementation, the delayed wing deploy action is triggered simultaneously with the rocket motor ignition action. The wing deploy action is delayed to occur at a predetermined delay to release deployable wings 210 via a wing hinge 242. Wing deploy trigger 240 can be fabricated from any material that enables a predetermined burn rate and/or trigger delay action including, but not limited to, an electronically actuated triggering mechanism. In the present implementation, wing hinge 242 is a coiled spring mounted about two rigid structures attached together by an axle, however, it should be noted that wing hinge 242 can be any release mechanism that enables wings 210 to deploy as described herein. Alternatively, wings 210 are deployed in response to command from computing device 202. In such an implementation, wings 210 can be released in response to any condition including but not limited to, a predetermined altitude, a determined maximum altitude, and a remote user command. In one implementation, the user command is transmitted by portable device 102 and received by computing device 202.

Figure 3:
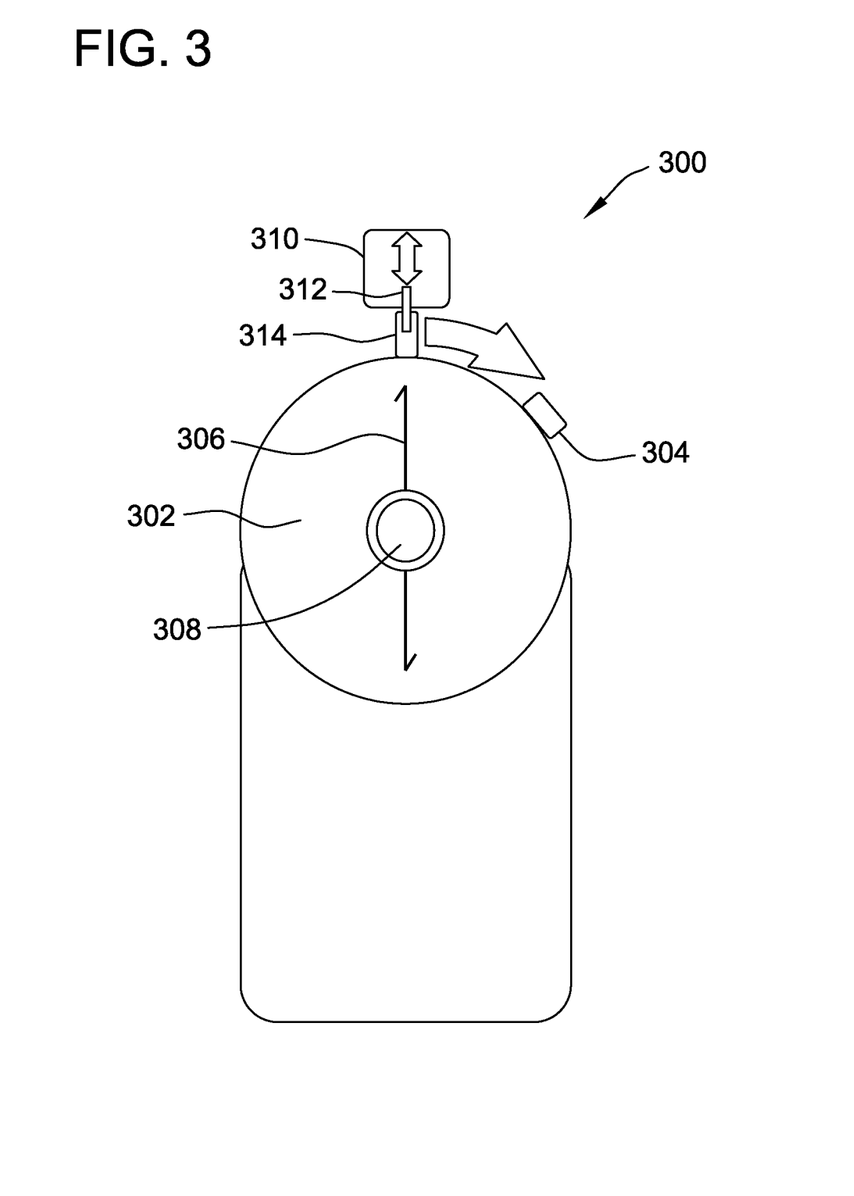
FIG. 3 is a schematic view of an exemplary wing hinge that may be used use with the aircraft shown in FIG. 2.

FIG. 3 is a schematic view of an exemplary wing hinge 300 for use with aircraft 200 shown in FIG. 2, such as wing hinge 242. In the present implementation, wings 210 are deployed on aircraft 200 via wing hinge 242 and/or 300. In the present implementation, wing hinge 300 is coupled to leading edge 211 of wings 210 for deployment. Wing hinge 300 includes a hinge disk 302 and a body disk body block 304 that are coupled to a first end of a coiled spring 306 held in place by a hinge rod 308, which is rigidly attached to body 204. A second end of coiled spring 306 is attached to body 204. Wing hinge 300 also includes an electronically controlled pin triggering mechanism 310 having a pin 312 and a hinge block 314. Pin triggering mechanism 310 is configured to restrict movement of hinge disk 302 via an engaged position of the pin 312 relative to the hinge block 314. Until pin 312 is disengaged from hinge block 314, hinge block 314 prevents wings 210 from deploying by preventing movement of hinge disk 302 towards body block 304. When pin 312 is disengaged, hinge block 314 releases body block 304 to enable disk 302 towards body block 304 to rotate and thus deploy wings 210 to their deployed position. As described above, pin 312 disengagement can include any disengagement that facilitates deployment as described herein including, but not limited to, burning, severing, automated release, and pneumatic release.

In the present implementation, wing hinge 300 is also configured to retract wings 210. When commanded to engage, the retracting mechanism (not shown) twists hinge disk 302 to an engaged position to fold wings 210 back to a non-deployed position. The retracting mechanism is commanded to disengage once hinge disk 302 is positioned and locked in an engaged position. Like deployment of wings 210, a retraction of wings 210 can occur in response to any condition including but not limited to, a predetermined altitude, a determined minimum altitude, a computing device command, and a remote user command. The purpose of retracting wings 210 is to 1) prepare aircraft 200 for launch or reuse, 2) protect wings 210 during landing, 3) reduce the visible size of aircraft 200 after landing to stay hidden from view until safely retrieved, if ever, and 4) reduce the size of aircraft 200 after landing to reduce the time taken to safely retrieve aircraft 200.

Referring back to FIG. 2, in the present implementation, aircraft 200 includes a parachute 244 that is ejected from body 204 to enable aircraft 200 to arrest forward motion and slowly descend at a reduced speed. In such an implementation, a portion of parachute 244 is ejected from aircraft 200 by a detonator 246 and/or explosive charge. In the present implementation, the parachute deployment is electronically activated by an onboard or a remote command. In one implementation, parachute 244 and nose cone 206 are ejected from body 204. In such an implementation, nose cone 206 is disposable. In one implementation, parachute 244 is ejected such that a portion 248 of nose cone 206 is hingedly released at hinge 250. In the present implementation, to protect parachute 244 and computing device 202, wadding 252 is used to absorb and prevent any extended fire and/or heat from the explosion provided by detonator 246.

Figure 5:
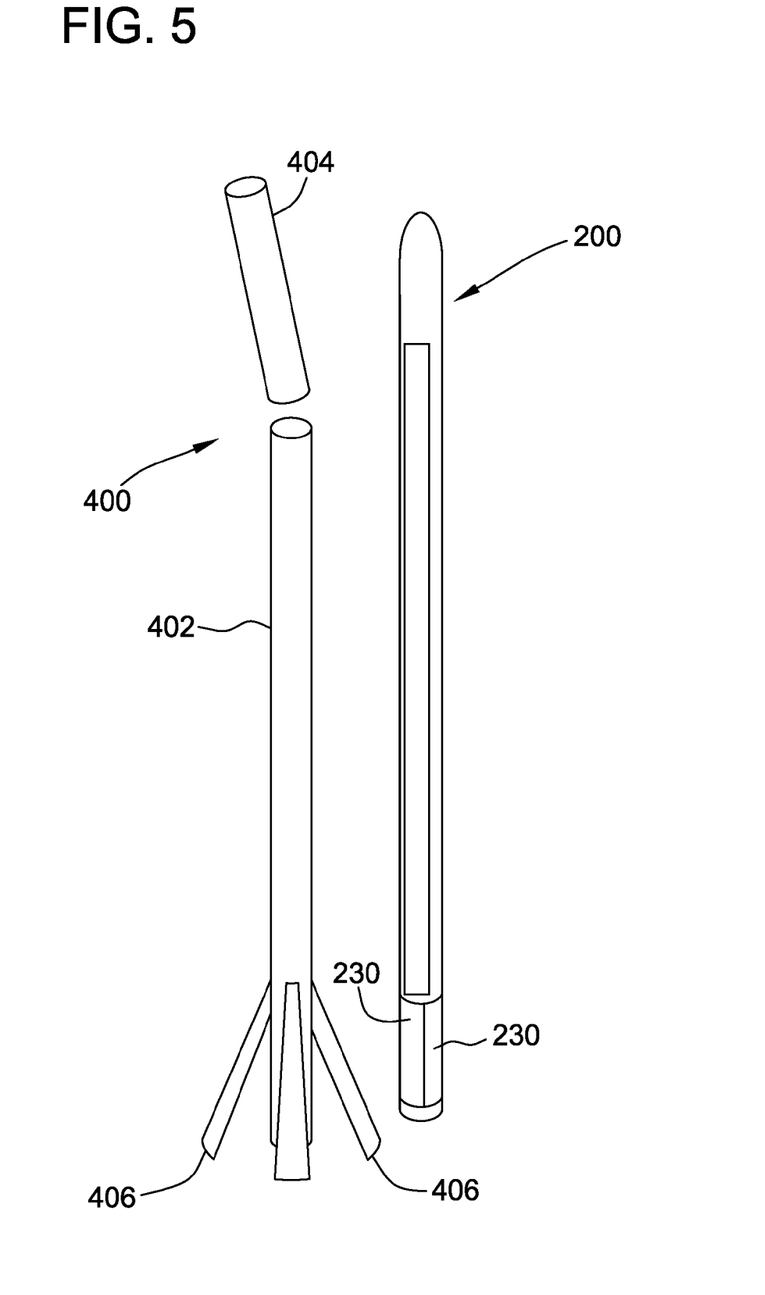
FIG. 5 is a schematic view of an exemplary launch apparatus that may be used with the aircraft shown in FIG. 2.

FIG. 5 is a schematic view of an exemplary launch apparatus 400 that may be used with the aircraft 200 shown in FIG. 2. In the present implementation, aircraft 200 is launched out of launch apparatus 400 from a location determined suitable by a user 106. Launch apparatus 400 includes a base 402 and a cap 404. In the present implementation, launch apparatus 400 is substantially hollow allowing a person to carry and/or load aircraft 200 into launch apparatus 400. Launch apparatus 400 is configured to be carried on the back of a person (e.g., a sling) and transported long distances in all weather conditions. In the present implementation, launch apparatus 400 is fabricated from a rigid casing that is water resistant to about 10 meters. Alternatively, apparatus 400 can be fabricated from any material that facilitates launching and achieving portability is described herein. In one implementation, launch apparatus includes retractable feet 406 that statically erect and stabilize apparatus 400 during a launch. In another implementation, apparatus 400 as configured to launch aircraft 200 from a held position (e.g., over a shoulder or to one's side). In another implementation, aircraft 200 is configured to be dropped and/or released from a carrying aircraft 504 (shown in FIG. 6).

In the present implementation, when aircraft 200 is loaded and/or retained within apparatus 400, deployable body conforming tail fins 230 are retained against body 204. In one implementation, deployable tail fins 230 include springs that deploy fins 230 and locks fins 230 in the deployed position when aircraft 200 emerges from apparatus 400. Alternatively, tail fins 230 can be deployed in response to any condition including but not limited to, a predetermined altitude, a computing device command, and a remote user command. In one implementation, apparatus 400 is a thin rod attached to a tripod configured to retain aircraft in a predetermined position until aircraft 200 is launched.

Figure 6:
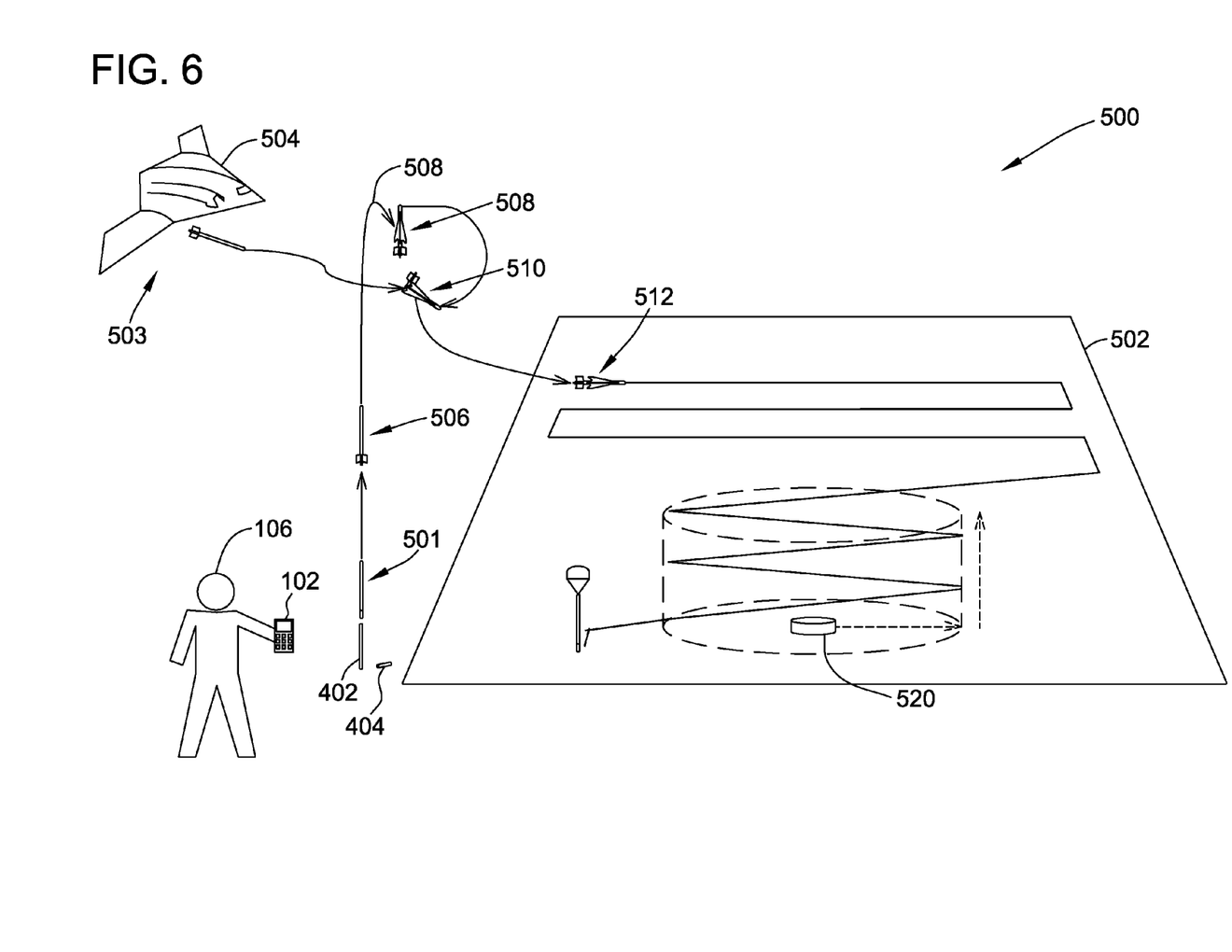
FIG. 6 is an illustration of an exemplary use of the system shown in FIG. 1.

FIG. 6 is an illustration of an exemplary use 500 of system 100, shown in FIG. 1. In the present implementation, aircraft 108 and/or 200 is launched 501 towards an area of interest 502. In one implementation, aircraft 108 is launched 501 from apparatus 400. In an alternative implementation, aircraft 108 is dropped 503 and/or released from a carrier aircraft 504. Tail fins 230 are deployed 506 to help control aircraft 108 while being directed towards and inside of area of interest 502. When aircraft 108 reaches a maximum altitude 508, wings 210 are deployed 508 to initiate a glide phase for aircraft 108.

In the present implementation, to help facilitate a stable flight of aircraft 108 computing device 202 pitches 510 tail section 208 up with respect to aircraft body 204. In one implementation, computing device 202 pitches 510 tail section 208 up and/or down substantially perpendicular with respect to aircraft body 204 by a predetermined amount. Once vehicle 100 is in a stabilized spinning attitude and the remaining attitude rates subside, tail section 208 returns 512 to a spin stabilization position until the spin is stabilized and then begins steering aircraft 108 to fly straight and level in a desired heading via flight computer 212 and/or portable device 102. The desired heading can be any number of headings based on predetermined flight plans, search patterns, loitering patterns, or any other flight pattern that can be performed by the aircraft. If during flight, flight computer 212 is overwhelmed by outside forces (e.g., sudden wind gusts) that places the aircraft in an unusual attitude, the flight computer 212 repeats these flight stabilization maneuvers again until flight is resumed.

In the present implementation, aircraft 108 flies through a series of predetermined waypoints to search for a Target(s) of Interest (TOI) 520 within the area of interest 502. Aircraft 108 is configured to use loitering maneuvers above TOI 520 or a fixed point on the surface in area of interest 502 while computing device 202 obtains situational awareness information about TOI 520 and/or area of interest 502. In one implementation, at high altitudes, aircraft 108 zooms in and slowly scans area of interest 502 providing still and/or video images to user 106 via portable device 102. At low altitudes, aircraft 108 zooms out and quickly scans the area below area of interest 502 providing still and/or video images to user 106 via portable device 102. The images provided are visual and/or infrared. In one implementation, aircraft 108 provides tracking information of TOI 520. Aircraft 108 is configured to use loitering maneuvers above a moving TOI 520 on the surface in area of interest 502 while computing device 202 obtains situational awareness information about TOI 520. Tracking of a TOI 520 can occur in any manner that facilitates obtaining situational awareness information as described herein including, but not limited to, laser and radar. In one implementation, situational awareness information is captured and stored locally by computing device 202 for later retrieval.

In the present implementation, aircraft 108 is guided through onboard autonomous guidance using predetermined waypoints and GPS sensor 220. In an alternative implementation, aircraft 108 is guided by a user 106 using portable device 102. Alternatively, aircraft 108 can be guided in any manner that facilitates obtaining situational awareness information as described herein including, but not limited to, a combination of autonomous guidance and user directed guidance. User 106 can be within a line-of-sight distance from aircraft 108 or at another location where no line-of-sight is possible.

In the present implementation, the position and attitude of aircraft 108 is measured by onboard sensors (not shown). In one implementation, the position of aircraft 108 is uploaded via telemetry data coming from remote sensors measuring aircraft 108 position. Aircraft 108 is guided through a series of pre-defined inputs. The inputs and guidance can be overridden by a user at any time. In the present implementation, computing device 104 determines the real-time position of aircraft 108 using GPS module 220. Alternatively, computing device 104 may interface with one or more external devices to determine the real-time position of aircraft 108. For example, computing device 104 may interface with an external GPS device onboard aircraft 108.

In the present implementation, once the flight energy is depleted and/or a command is given by computing device 202, aircraft 108 is flown to a predetermined landing area. When aircraft 108 arrives at the predetermined landing area or a command is given by computing device 202, wings 210 and fins 230 are retracted and parachute 244 is released by aircraft 108. In an event in which, parachute 244 is caught by obstacles (e.g., trees, power lines, and man-made objects), parachute 244 can be release from aircraft 108 to allow aircraft to fall from the obstruction. It should be noted that the commands given during landing can be transmitted by a user 106 via portable device 102. In one implementation, no parachute 244 is deployed and wings 210 and tail fins 230 are not retracted. In such an implementation, aircraft 108 is allowed to glide to a landing.

Once aircraft 108 lands on an underlying supportive surface (e.g. the ground or a deck) or in the water, aircraft 108 can be retrieved for refurbishment and/or re-use, abandoned, or destroyed. Aircraft 108 can be refurbished and reused by replacing rocket motor 232 (FIG. 2). If needed, motor igniter 234 and igniter/detonator wiring 240 are replaced, parachute 244, nose cone 206, wading 252, and detonator 246 are replaced or repacked, and wing deploy trigger 312 (FIG. 3) is reset.

Figure 7:
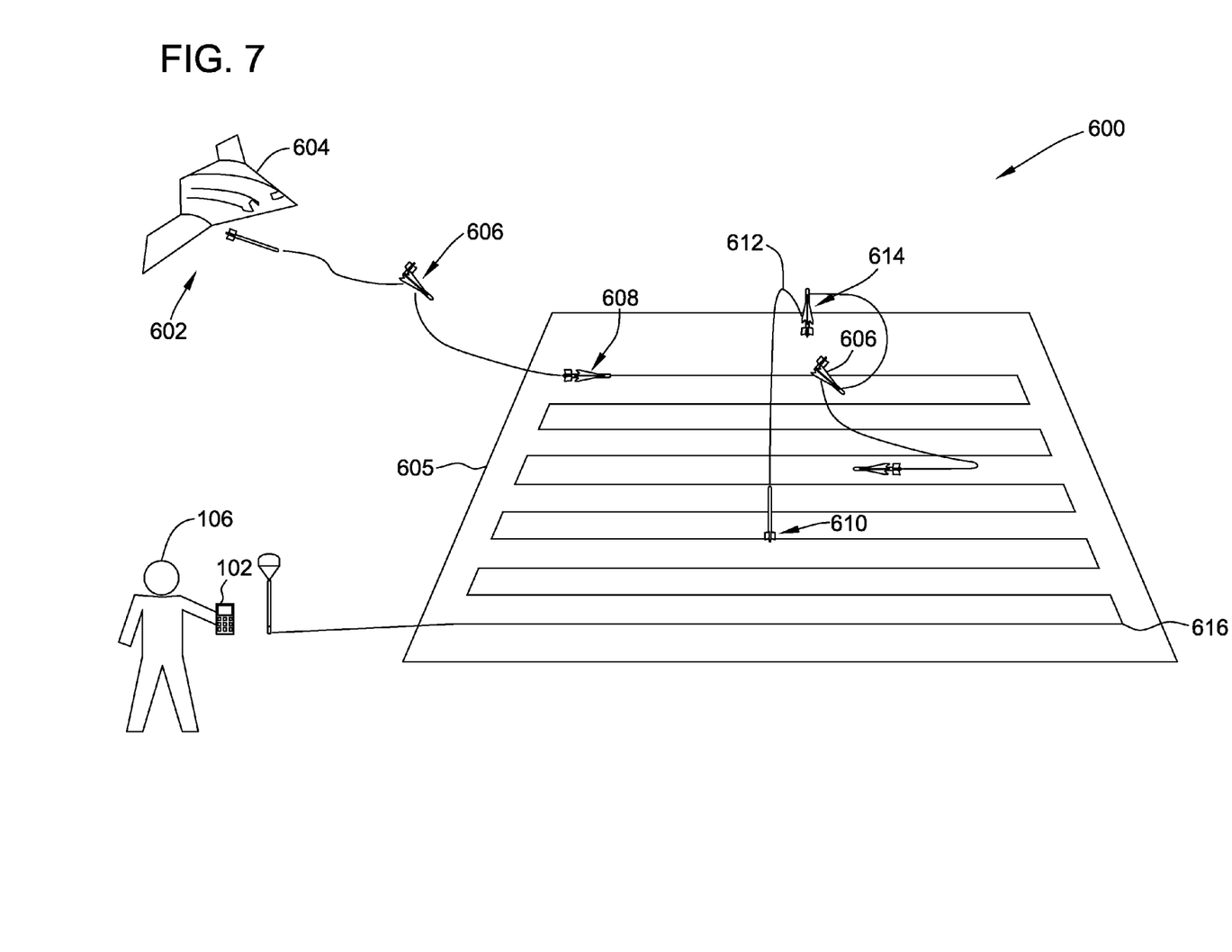
FIG. 7 is an illustration of an alternative use of the system shown in FIG. 1.

FIG. 7 is an illustration of an alternative use 600 of system 100, shown in FIG. 1. In the present implementation, aircraft 108 is released 602 and/or dropped from a carrier aircraft 604 towards an area of interest 605. To help facilitate a stable flight of aircraft 108 computing device 202 pitches 510 tail section 208 up and/or down with respect to aircraft body 204. In one implementation, computing device 202 pitches 510 tail section 208 up and/or down substantially perpendicular with respect to aircraft body 204. Once vehicle 100 is in a stabilized spinning attitude and the remaining attitude rates subside, tail section 208 returns 608 to a spin stabilization position until the spin is stabilized and then begins steering aircraft 108 to fly straight and level in a desired heading. In the present implementation, aircraft 108 flies through a series of predetermined waypoints to search for a TOI within the area of interest 605. Aircraft 108 is configured to use loitering maneuvers above a moving or non-moving TOI or a fixed point on the surface in the area of interest 502 while computing device 202 obtains situational awareness information about a TOI and/or area of interest 605.

In the present implementation, once the flight energy is depleted 610 and/or a command is given by computing device 202, the aircraft is pitched straight up, the wings 210 are retracted, igniter 234 is ignited and aircraft 108 is thrust to a higher altitude. When aircraft 108 reaches a maximum altitude 612, wings 210 are redeployed 614, flight of aircraft 108 is stabilized, and aircraft 108 resumes obtaining situational awareness information. Once the flight energy is depleted and/or a command is given by computing device 202, aircraft 108 is flown 616 to a predetermined landing area for retrieval, abandonment, or destruction.

Figure 8:
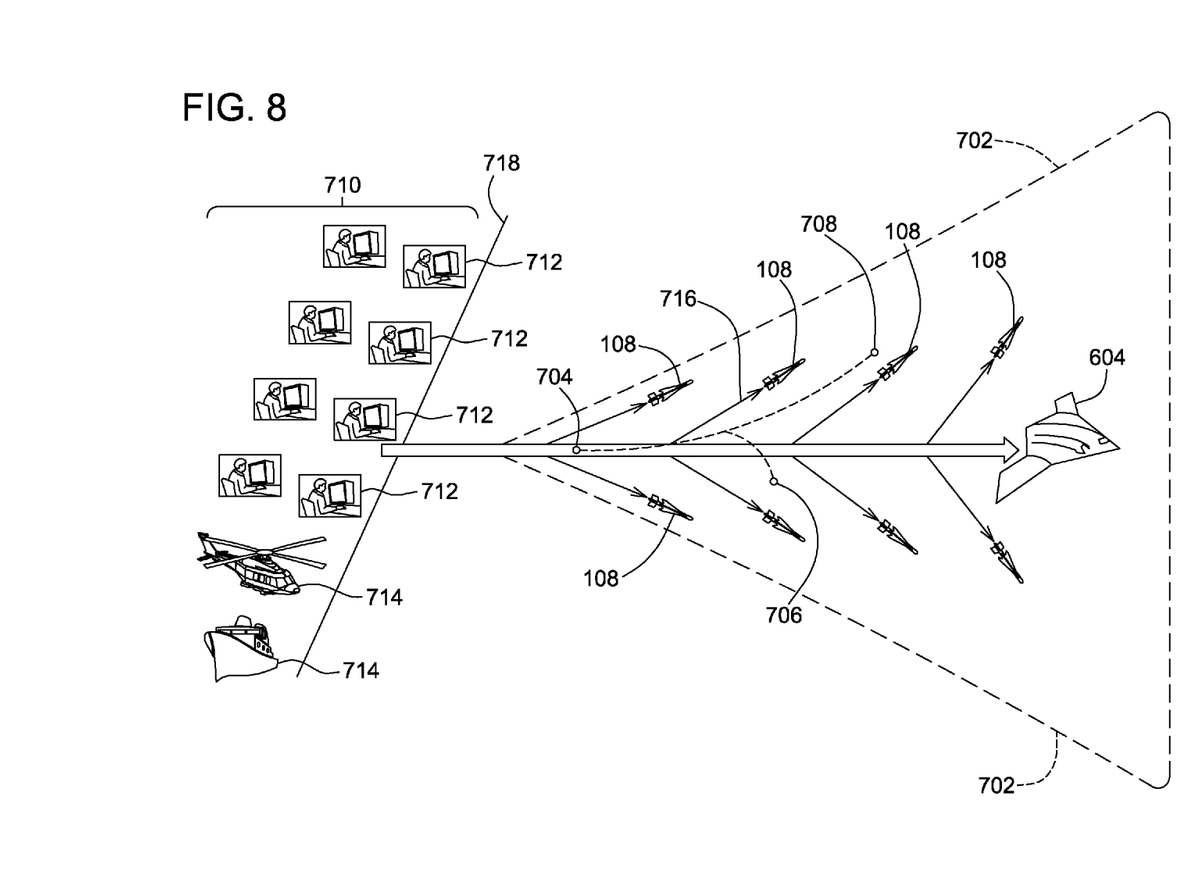
FIG. 8 is an illustration of an alternative use of the system shown in FIG. 1.

FIG. 8 is an illustration 700 of an alternative use of system 100, shown in FIG. 1. Illustration 700 is a diagram of an operation for a search and recovery of survivors and equipment using system 100 in a hostile or remote environment 702. In the present implementation, aircraft 108 are released and/or dropped from a carrier aircraft 604 while flying inside of an area of interest 702. Area of interest 702 includes a last reported survivor position 704 and actual survivor positions 706 and 708. A first survivor position 706 and a second survivor location 708 are located within the estimated boundary of area of interest 702. It is assumed first and second survivors separated for survival reasons.

In the present implementation, aircraft 108 is directed by a rescue team 710 including operators 712 and rescue personnel and equipment 714. This situational awareness information is transmitted from aircraft 108 to search and rescue operators 712. In one implementation, situational awareness information is transmitted to operators 712 after aircraft 108 have completed search patterns 716, however, situational awareness information can be transmitted at any time. Search patterns 716 are assigned and executed by search and rescue operators 712 on the other side of a hostile or remote environment boundary 718. Rescue personnel and equipment 714 includes search and rescue aircraft, vehicles, vessels, and other related equipment of various types and the people associated with the equipment trained to perform the search and coordinate the rescue operations.

When an object of interest is spotted on a display showing images transmitted from aircraft 108, the operator can immediately zoom in to further discriminate the value of that spotted object. In one implementation, the situational awareness information is recorded for later review and training purposes. When an object of interest is identified as a potential survivor or piece of undiscovered wreckage, this information triggers a series of confirmations followed by the deployment of additional people and equipment to this location for either rescue or retrieval. In one implementation, aircraft 108 loiters in the area as long as possible; however, aircraft 108 can continue its search pattern to search for additional missing survivors. When the altitude of aircraft 108 is depleted, aircraft 108 lands in a predetermined location.

Figure 9:
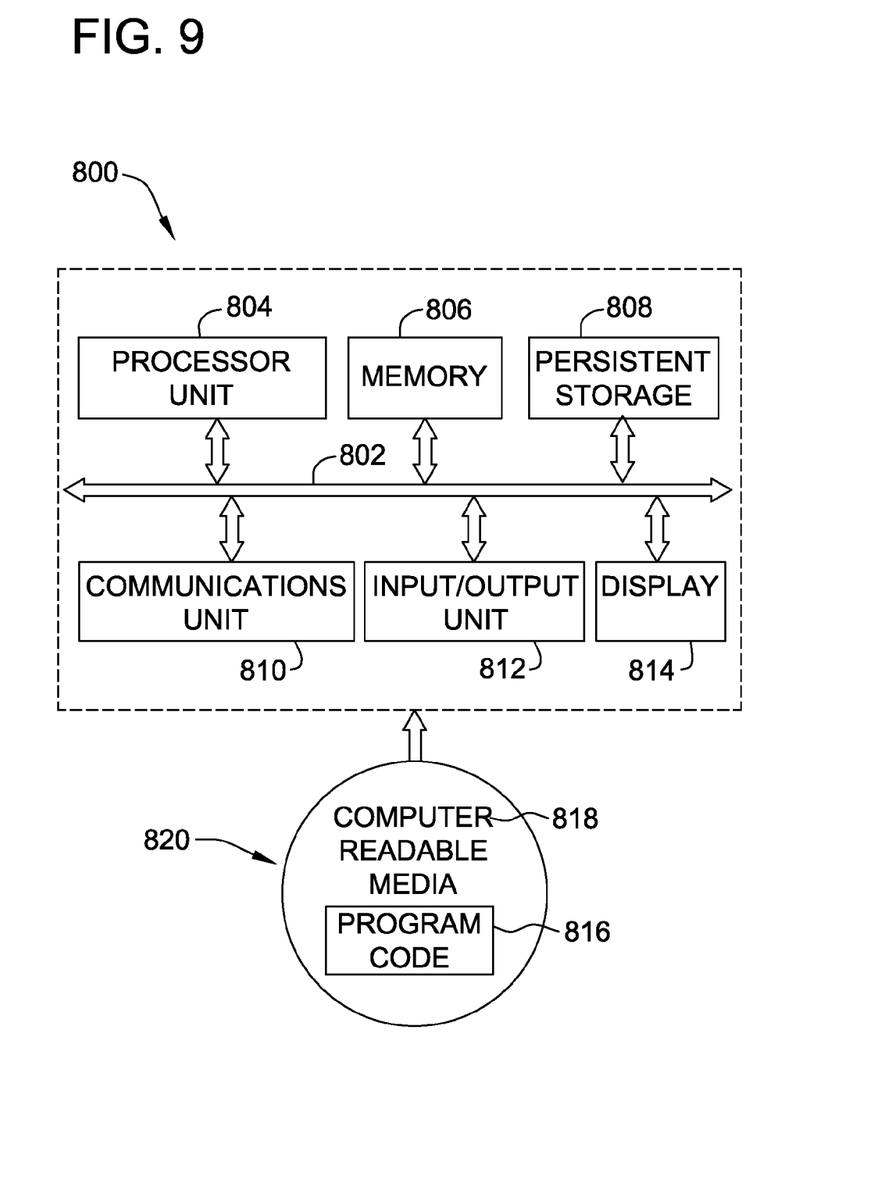
FIG. 9 is a diagram of an exemplary computing device that may be used as part of the system shown in FIG. 1.

FIG. 9 is a diagram of an exemplary computing device 800 that may be used as part of system 100 shown in FIG.

1, such as portable device 102 and computing device 104. In the present implementation, computing device 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. Processor unit 804 may be a set of one or more processors or may be a multi-processor core, depending on the particular implementation. Further, processor unit 804 may be implemented using one or more heterogeneous processor systems in which a main processor is present with secondary processors on a single chip.

As another illustrative example, processor unit 804 may be a symmetric multi-processor system containing multiple processors of the same type. Further, processor unit 804 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Memory 806 and persistent storage 808 are examples of storage devices. A storage device is any piece of hardware that is capable of storing information either on a temporary basis and/or a permanent basis. Memory 806, in these examples, may be, for example, without limitation, a random access memory or any other suitable volatile or non-volatile storage device. Persistent storage 808 may take various forms depending on the particular implementation.

For example, without limitation, persistent storage 808 may contain one or more components or devices. For example, persistent storage 808 may be a hard drive, a flash memory, a rewritable optical disk, or some combination of the above. The media used by persistent storage 808 also may be removable. For example, without limitation, a removable hard drive may be used for persistent storage 808.

Communications unit 810, in these examples, provides for communications with other data processing systems or devices. In these examples, communications unit 810 is a network interface card. Communications unit 810 may provide communications through the use of one or all of wireless, cellular, and satellite communication links.

Input/output unit 812 allows for input and output of data with other devices that may be connected to computing device 800. For example, without limitation, input/output unit 812 may provide a connection for user input through a keyboard, mouse, and/or touchscreen. Display 814 provides a mechanism to display information to a user.

Instructions for the operating system and applications or programs (e.g., flight computer) are located on persistent storage 808. These instructions may be loaded into memory 806 for execution by processor unit 804. The processes of the different implementations may be performed by processor unit 804 using computer implemented instructions, which may be located in a memory, such as memory 806. These instructions are referred to as program code, computer usable program code, or computer readable program code that may be read and executed by a processor in processor unit 804. The program code in the different implementations may be embodied on different physical or tangible computer readable media, such as memory 806 or persistent storage 808.

Program code 816 is located in a functional form on computer readable media 818 that is selectively removable and may be loaded onto or transferred to computing device 800 for execution by processor unit 804. Program code 816 and computer readable media 818 form computer program product 820 in these examples. In one example, computer readable media 818 may be in a tangible form, such as, for example, an optical or magnetic disc that is inserted or placed into a drive or other device that is part of persistent storage 808 for transfer onto a storage device, such as a hard drive that is part of persistent storage 808. In a tangible form, computer readable media 818 also may take the form of a persistent storage, such as a hard drive, a thumb drive, or a flash memory that is connected to computing device 800. The tangible form of computer readable media 818 is also referred to as computer recordable storage media. In some instances, computer readable media 818 may not be removable.

Alternatively, program code 816 may be transferred to computing device from computer readable media 818 through a communications link to communications unit 810 and/or through a connection to input/output unit 812. The communications link and/or the connection may be physical or wireless in the illustrative examples. The computer readable media also may take the form of non-tangible media, such as communications links or wireless transmissions containing the program code.

In some illustrative implementations, program code 816 may be downloaded over a network to persistent storage 808 from another device or data processing system for use within computing device 800. For instance, program code stored in a computer readable storage medium in a server data processing system may be downloaded over a network from the server to computing device 800. The data processing system providing program code 816 may be a server computer, a client computer, or some other device capable of storing and transmitting program code 816.

The different components illustrated for computing device 800 are not meant to provide architectural limitations to the manner in which different implementations may be implemented. The different illustrative implementations may be implemented in a data processing system including components in addition to or in place of those illustrated for computing device 800. Other components shown in FIG. 8 can be varied from the illustrative examples shown. As one example, a storage device in computing device 800 is any hardware apparatus that may store data. Memory 806, persistent storage 808 and computer readable media 818 are examples of storage devices in a tangible form.

The implementations described herein facilitate capturing situational awareness information. The implementations described herein enable a person to quickly transport and deploy a virtually undetectable aircraft to obtain time-critical situational awareness information at practically a moment's notice in a cost effective manner. The implementations described herein significantly reduce the cost, complexity, and inaccessibility of existing systems. The implementations described herein can be used with multiple aircraft to obtain more precise situational awareness information. For example, multiple aircrafts can be launched from different locations in a swarm fashion to search, detect, identify, and pinpoint a TOI. In the case of a group stranded at sea, the implementations described herein enable a person to quickly deploy and dispatch an aircraft towards the shore to look for other people on shore. Once people are located, the aircraft can be directed to land next to them and notify them of the group's emergency situation.

In one implementation of use, an aircraft is flown to the last known location of people involved in a search and rescue operation. Once there, the aircraft described herein are deployed to search a large area from a safe location. Deployment can be accomplished the same way as a sonar buoy deployment from an aircraft. Such operations using known technologies are often costly and time consuming.

In one implementation deployed aircraft can land in a body of water, be made to float (if necessary), and contain a locating beacon that leads to a recovery of the aircraft. While searching, the aircraft can transmit an audible sound and visual signals to alert survivors of its presence. The aircraft could deliver emergency lifesaving payloads to rescue victims.

Unlike at least some known situational awareness systems, the systems and methods described herein utilize a portable and reusable system that is relatively inexpensive, accessible, easy to use, and virtually undetectable by enemy forces. Furthermore, unlike at least some known situational awareness systems, the portability of the implementations described herein provide timeliness of accurate situational awareness information from a high vantage point that can aid in the preservation of human life. This time-critical contact during a rescue attempt could make the crucial difference in a life-threatening situation. The value of this type of information is that it will save lives and lower risk to expensive reusable operational equipment.

This system and method of use can save lives of those in a hostile or remote environment. By definition, a hostile or remote environment threatens to some degree, the lives of the people who enter it. When exposed to a hostile or remote environment, the item that contributes the most to survival is situational awareness, (e.g., if one knew of a secluded cabin a short distance away, they may not have to spend precious time and effort trying to build a fire without matches out in the cold). Searching for and discovering valuable visual information from above a hostile or remote environment can be accomplished more cost-effectively and more efficiently than known systems.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A portable aircraft for use in obtaining situational awareness information, said aircraft comprising:
   a body including deployable wings configured for unpowered controlled gliding flight, said deployable wings comprising a leading edge formed by a portion of said body;
   a tail section coupled to said body, said tail section comprising:
   deployable tail fins;
   a pivotable tail section enabling said tail section to rotate into a position substantially perpendicular to said body; and
   a reusable rocket motor configured to burn propellant to propel said portable aircraft to a predetermined maximum altitude, wherein reaching the predetermined maximum altitude triggers disengagement of said reusable rocket motor and initiates unpowered controlled gliding flight;
   a capture device configured to selectively capture situational information;
   a communications device configured to transmit captured situational information to a ground based receiver; and
   a computing device configured to control said deployable tail fins and said pilotable tail section to stabilize flight from the predetermined maximum altitude.

2. The aircraft in accordance with claim 1, wherein said deployable wings are wings configured to deploy in response to at least one of a predetermined altitude, a determined minimum altitude, a computing device command, and a remote user command.

3. The aircraft in accordance with claim 1, wherein said tail section is configured to stabilize said portable aircraft as said portable aircraft travels.

4. The aircraft in accordance with claim 1, wherein said capture device comprises a video camera for use in capturing video of a target of interest.

5. The aircraft in accordance with claim 1, wherein said capture device comprises a camera for use in capturing at least one of still images and infrared images of a target of interest.

6. The aircraft in accordance with claim 1, further comprising a flight control system configured to guide said portable aircraft.

7. The aircraft in accordance with claim 1, wherein said portable aircraft comprises an unmanned aerial vehicle.

8. A portable system configured to selectively obtain situational awareness information, said portable system comprising:
   a launch apparatus; and
   an aircraft configured to launch from the launch apparatus and to obtain situational awareness information aloft, said aircraft comprising:
   a body including deployable wings configured for unpowered controlled gliding flight, said deployable wings comprising a leading edge formed by a portion of said body;
   a tail section coupled to said body, said tail section comprising:
   deployable tail fins;
   a pivotable tail section enabling said tail section to rotate into a position substantially perpendicular to said body; and
   a reusable rocket motor configured to burn propellant to propel said portable aircraft to a predetermined maximum altitude, wherein reaching the predetermined maximum altitude triggers disengagement of said reusable rocket motor and initiates unpowered controlled gliding flight;
   a capture device configured to selectively capture situational information;
   a communications device configured to transmit captured situational information to a ground based receiver; and
   a computing device configured to control said deployable tail fins and said pilotable tail section to stabilize flight from the predetermined maximum altitude.

9. The portable system in accordance with claim 8, wherein said deployable wings are configured to deploy in response to at least one of a predetermined altitude, a determined minimum altitude, a computing device command, and a remote user command.

10. The portable system in accordance with claim 8, wherein said tail section is configured to stabilize said aircraft as said aircraft travels.

11. The portable system in accordance with claim 8, wherein said capture device comprises a video camera for use in capturing video of a target of interest.

12. The portable system in accordance with claim 8, wherein said capture device comprises a camera for use in capturing at least one of still images and infrared images of a target of interest.

13. The portable system in accordance with claim 8, further comprising a flight control system configured to guide said aircraft.

14. The portable system in accordance with claim 8, wherein said aircraft comprises an unmanned aerial vehicle.

15. A method for obtaining situational awareness information, said method comprising:
  burning propellant to propel a portable aircraft to a predetermined maximum altitude using a reusable rocket motor;
  disengaging the reusable rocket motor triggered upon reaching the predetermined maximum altitude;
  engaging unpowered controlled gliding flight after disengaging the reusable rocket motor;
  employing deployable tail fins and a pivotable tail section in the unpowered controlled gliding flight, the pivotable tail section configured to rotate into a position substantially perpendicular to said body;
  controlling, by a computing device, the deployable tail fins and the pivotable tail section to stabilize flight from the predetermined maximum altitude;
  guiding said portable aircraft by at least one of a flight control system and a user located outside the portable aircraft;
  capturing situational awareness information of a target of interest; and
  transmitting the captured situational awareness information to a portable device located outside the portable aircraft.

16. The method in accordance with claim 15, wherein guiding further comprises deploying the deployable tail fins of the portable aircraft in response to at least one of a predetermined altitude, a determined minimum altitude, a computing device command, and a remote user command, the deployable tail fins comprising a leading edge formed by a portion of a body of the aircraft.

17. The method in accordance with claim 15, wherein controlling further comprises stabilizing the portable aircraft by pitching the pivotable tail section of the portable aircraft up with respect to a body of the portable aircraft.

18. The method in accordance with claim 15, wherein guiding further comprises guiding the portable aircraft to a predetermined landing area for landing.

19. The method in accordance with claim 18, further comprising releasing a parachute to land the portable aircraft.

20. The method in accordance with claim 15, wherein launching further comprises launching the portable aircraft from a portable launch apparatus.

\* \* \* \* \*